Patented Aug. 18, 1931

1,819,399

UNITED STATES PATENT OFFICE

GEORG WESENBERG, OF ELBERFELD, GERMANY, ASSIGNOR TO WINTHROP CHEMICAL COMPANY, INC., OF NEW YORK, N. Y., A CORPORATION OF NEW YORK

MEDIA FOR COMBATING ANIMAL AND VEGETABLE PESTS

No Drawing. Application filed March 14, 1929, Serial No. 347,181, and in Germany March 20, 1928.

The present invention relates to new media for combating animal and vegetable pests.

I have found, that the salts of hydrazoic acid such as the alkali metal- earthalkali metal-, aluminium-, magnesium-, iron salts and the like are valuable media for combating animal and vegetable pests, such as bacteria, mold fungi, spores of blight, mites, lice, grain-weevils, mice, rats and the like. These products may be applied in many different ways. For instance, aqueous solutions of the salts may be sprayed or otherwise brought into contact with the pests to be destroyed, or the salts may be incorporated with foods, such as bread, potatoes and the like, which foods are then laid out into rooms being infected with animal pests, or solutions of the salts are used for disinfecting purposes, or the salts are mixed with suitable carriers and these mixtures are strewed on infected places, and so on. Mixtures of different salts of hydrazoic acid can also be used, furthermore the addition of other insecticidal or bactericidal acting media, or suitable diluents or wetting agents and the like may often be useful. A special advantage of the salts of hydrazoic acid over other bactericides or fungicides is their very quick action upon the pests to be combated.

The following examples illustrate my invention, without limiting it thereto:—

*Example 1.*—1% of the sodium salt of hydrazoic acid is incorporated with mashed potatoes, and the paste thus obtained is laid out in rooms being infected with mites, ants, flies, grain-weevils, rats or the like. The animal pests mentioned will die within a short time.

*Example 2.*—A 0.2% solution of the salt mentioned in Example 1, in an aqueous soap solution of 0.5% strength is prepared. This solution is well suited for combating lice and other parasites or vegetable pests according to any desired manner within a short time.

I claim:—

1. As new media for combating animal and vegetable pests the salts of hydrazoic acid.

2. As new media for combating animal and vegetable pests the compounds of the group comprising the alkali metal- and earthalkali metal salts of hydrazoic acid.

3. As a new medium for combating animal and vegetable pests the sodium salt of hydrazoic acid.

In testimony whereof I have hereunto set my hand.

[L. S.]        GEORG WESENBERG.